(12) United States Patent
Maron

(10) Patent No.: US 9,982,788 B1
(45) Date of Patent: May 29, 2018

(54) METHOD AND APPARATUS FOR BLINDING NON-ENERGY SOURCES

(71) Applicant: Marathon Petroleum Company LP, Findlay, OH (US)

(72) Inventor: Michael Maron, Leaque City, TX (US)

(73) Assignee: Marathon Petroleum Company LP, Findlay, OH (US)

( * ) Notice: Subject to any disclaimer, the term of this patent is extended or adjusted under 35 U.S.C. 154(b) by 8 days.

(21) Appl. No.: 14/976,319

(22) Filed: Dec. 21, 2015

Related U.S. Application Data

(60) Provisional application No. 62/095,917, filed on Dec. 23, 2014.

(51) Int. Cl.
*F16L 55/10* (2006.01)
*F16K 3/312* (2006.01)

(52) U.S. Cl.
CPC .............. *F16K 3/312* (2013.01); *F16L 55/10* (2013.01)

(58) Field of Classification Search
CPC ....................................................... F16L 35/00
USPC ........... 138/89, 104, 94.3; 285/80; 166/92.1; 70/229–232
See application file for complete search history.

(56) References Cited

U.S. PATENT DOCUMENTS

| | | | | |
|---|---|---|---|---|
| 1,526,301 | A * | 2/1925 | Stevens | F16B 41/005 285/30 |
| 3,203,460 | A * | 8/1965 | Kuhne | E21B 17/043 138/89 |
| 3,840,209 | A * | 10/1974 | James | F16L 55/02772 138/43 |
| 3,912,307 | A | 10/1975 | Totman | |
| 4,733,888 | A * | 3/1988 | Toelke | B65D 59/06 138/89 |
| 5,066,049 | A * | 11/1991 | Staples | F16L 35/00 285/315 |
| 5,154,558 | A | 10/1992 | McCallion | |
| 5,494,079 | A * | 2/1996 | Tiedemann | F16L 55/105 138/89 |
| 5,556,222 | A | 9/1996 | Chen | |
| 6,076,864 | A | 6/2000 | Levivier et al. | |
| 7,866,346 | B1 * | 1/2011 | Walters | E21B 21/01 138/89 |
| 8,434,800 | B1 | 5/2013 | LeBlanc | |
| 2006/0169305 | A1 | 8/2006 | Jansen et al. | |
| 2006/0220383 | A1 | 10/2006 | Erickson | |
| 2010/0301044 | A1 * | 12/2010 | Sprecher | F42B 39/26 220/210 |

* cited by examiner

*Primary Examiner* — Patrick F Brinson
(74) *Attorney, Agent, or Firm* — Emch, Schaffer, Schaub & Porcello Co., L.P.A.

(57) ABSTRACT

This bleeder guard is used for blinding pipe flanges in refineries, chemical plants, and other fluid processing plants joined in many places by flanged joints. The bleeder guard is an elongated rod, having a first end with a threaded surface and a second end with a smooth surface. The bleeder guard preferably is a smooth elongated rod of uniform diameter. The elongated rod typically has a cylindrical shape.

5 Claims, 4 Drawing Sheets

METHOD AND APPARATUS FOR BLINDING NON-ENERGY SOURCES

CROSS-REFERENCE TO RELATED APPLICATION

The present patent application is based upon and claims the benefit of provisional patent application No. 62/095,917, filed on Dec. 23, 2014.

FIELD OF THE INVENTION

This invention relates to an improved way of blinding pipe flanges in refineries, chemical plants, and other fluid processing plants joined in many places by flanged joints.

BACKGROUND OF THE INVENTION

In a refinery, tank farm or other industrial setting where personnel must enter a vessel to inspect, repair or maintain the vessel any energy source or inlet capable of allowing energy to enter into the vessel is blinded. To prevent dangerous energy or other substances from entering the vessel a blind, usually a flat pancake like piece is inserted between a set of flanges that have been loosened. This blind blocks any flow through the pipe and allows personnel to enter a vessel without risk of harm.

Blinding does increase a risk of leakage and is extremely time consuming. The operator must remove the bolts around a flange to allow the blind to be inserted. The operator must then remove the blind and reattach the bolts to the flanges. Removing bolts and loosening flanges can produce leaks where none were present before. Further, given that most vessels often have dozens of entry points, the blinding process can be very time consuming. A number of the entry points on a vessel are often non-energy sources. These can be sight glasses or other unused ports that are not connected to any sort of energy source. Non-energy sources are often an open valve or pipe without the desired flanges capable of accepting a traditional blind. There is a desire to blind these non-energy sources to prevent an operator from accidently attaching an energy source while the vessel is being maintained. There is also a need in the industry to reduce the time and cost associated with blinding non-energy sources.

Exposure of energy to personnel could cause serious harm or even death. Therefore, there exists a need to prevent exposure to any energy source while inside a vessel.

SUMMARY OF THE INVENTION

An apparatus has been developed for quickly and efficiently blinding a non-energy source. A bleeder guard is attached to a non-energy source. The bleeder guard prevents another operator from attaching anything to the non-energy source. This bleeder guard is generally cylindrical, having one end threaded while the other end is unthreaded. The threaded end is inserted into the non-energy source without the removal any bolts or flanges. The unthreaded end of the bleeder guard, being exposed, renders it un-attachable to an energy source and therefore, protects the operator inside the vessel from exposure to energy sources.

The unthreaded end may be painted a distinctive color to indicate that it is a bleeder guard and should not be removed. This bleeder guard eliminates the need use of a traditional blind on non-energy source locations, saving time and cost over the prior art.

The bleeder guard may also have a hole drilled through to allow a lock to be placed through the bleeder guard to prevent removal. With the bleeder guard in place a hose cannot be attached to the bleeder guard, as there are no threads available on the nipple once the threaded end has been threaded into place.

Once the maintenance or inspection of the vessel is completed, the bleeder guard is removed and the vessel is brought online.

Other objects and advantages of the present invention will become apparent to those skilled in the art upon a review of the following detailed description of the preferred embodiments and the accompanying drawings.

IN THE DRAWINGS

DETAILED DESCRIPTION OF THE INVENTION

Figure 1:
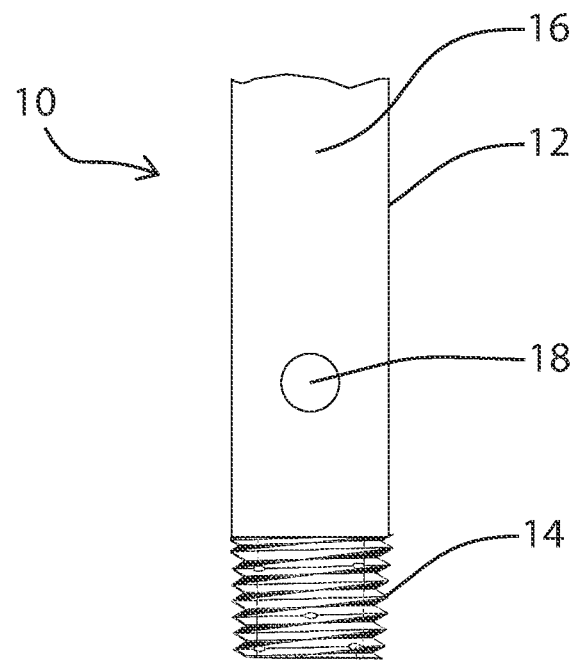
FIG. 1 is a view of the bleeder guard of this invention.

FIG. 1 is a view of the bleeder guard 10 of this invention. Bleeder guard 10 is an elongated rod 12. Elongated rod 12 has a first end having a threaded surface 14 and a second end having a smooth surface 16. FIG. 1 also shows a hole 18 through smooth surface 16 of bleeder guard 10.

Figure 2A:
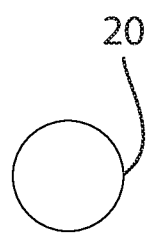
FIGS. 2A and 2B are an end view and a side view of a locking device according to this invention.
Figure 2B:
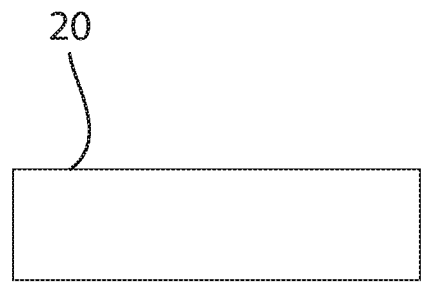

FIGS. 2A and 2B are an end view and a side view of lock 20 according to this invention. Lock 20 is placed through hole 18 of bleeder guard 10.

Figure 3:
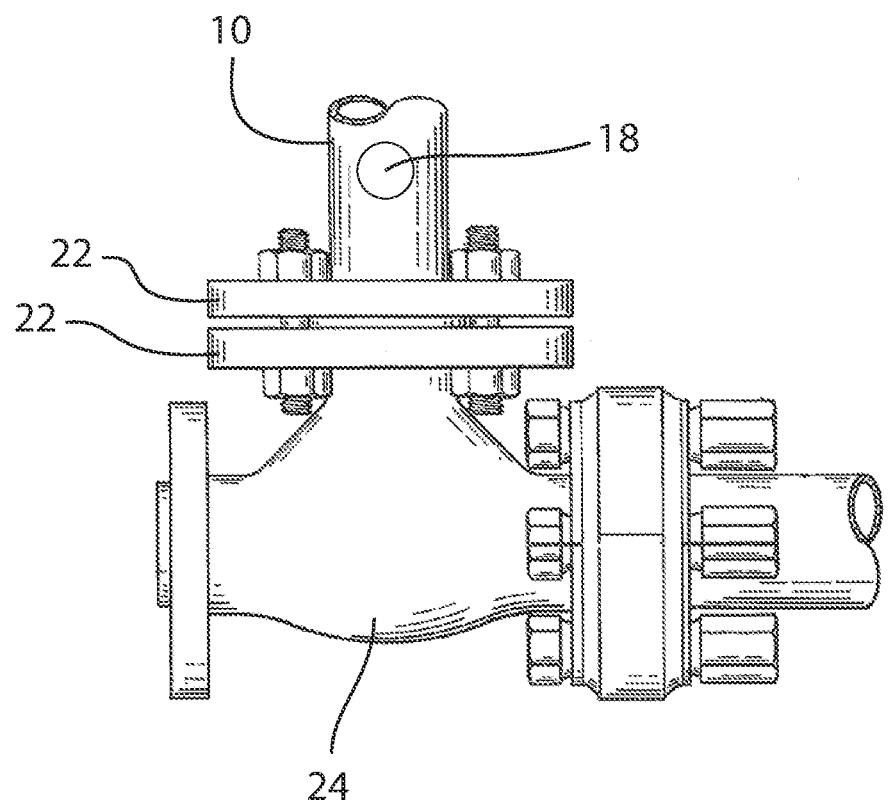
FIG. 3 is a view showing the bleeder guard of this invention attached to a flanged joint.

FIG. 3 is a view showing bleeder guard 10 of this invention attached to flanged joint 22. Flanged joint 22 has an aperture (not shown) passing therethrough. The aperture has a threaded surface (not shown). Threaded surface 14 of bleeder guard 10 engages the threaded surface of the aperture. Threaded surface 14 and the threaded surface of flange 22 co-operate to reduce leaks and blind a vessel 24 attached to flange 22.

Figure 4A:
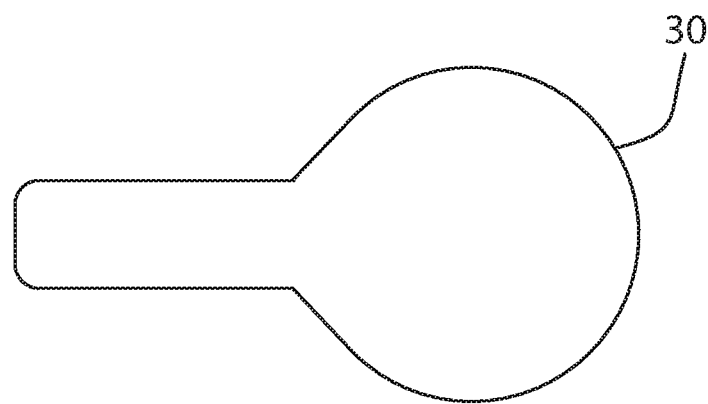
FIGS. 4A and 4B are a top view and a side view showing a prior art blind.
Figure 4B:

FIGS. 4A and 4B are a top view and side view showing prior art blind 30. The blind 30 used is a flat pancake shaped device. The surface of the blind must be larger than the flange but of less diameter than that defined by the bolts to be blocked. The bolts around the flange are either loosened or removed and the blind is inserted to block the flow of product through the flange.

When a valve is not attached to an energy source, the valve often has an exposed threaded opening. This threaded opening could be attached to an energy source at an inappropriate time such as, during maintenance or inspection of a vessel. The invention provides a bleeder guard to prevent attachments to exposed valves (non-energy sources). The bleeder guard is preferably, an elongated tube or cylinder having a threaded end and an unthreaded end. The unthreaded end may be painted a distinct color to illustrate that it is a bleeder guard. The bleeder guard may be solid or hollow depending on need. The bleeder guard may include a hole on the unthreaded end through which a lock can be placed. This lock prevents removal of the bleeder guard during inspection or maintenance of the vessel. The unthreaded end of the bleeder guard, having no threads, is incapable of being attached to an energy source, thus protecting operator from an unexpected exposure to energy sources.

Referring now to FIG. 3, to blind a non-energy source or open valve, the bleeder guard is aligned so that the threaded end is aligned to enter the non-energy source. The non-energy source having threads capable of accepting the threaded end of the bleeder guard. The bleeder guard is turned in such a direction that the threads of the bleeder guard and the non-energy source join. A lock is placed through the non-energy source and the bleeder guard so that the bleeder guard may not be removed without removal of the lock. The bleeder guard may also be locked to an adjacent valve to prevent removal of the bleeder guard, or movement of the valve.

Once the remaining energy sources and non-energy sources are blinded, personnel may enter the vessel to complete the desired task. Once the task is completed, the lock is removed from the bleeder guard. The bleeder guard is turned in such a direction that the threads of the bleeder guard and the non-energy source separate. The non-energy source is then returned to its original condition, the remaining blinds are removed, and the vessel may be brought online.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A guard for blinding a non-energy pipe flanged joint of a fluid processing plant, the flanged joint including an aperture passing therethrough, said aperture having a threaded surface; the guard comprising an elongated rod having a first end with a threaded surface and an opposed second end having a smooth surface, wherein the threaded surface of the elongated rod is threaded into engagement with the threaded surface of the aperture thereby preventing the attachment of an energy source to the non-energy pipe flanged joint.

2. A guard according to claim 1 wherein the second end of the guard having a smooth surface is unthreaded and configured to be un-attachable to an energy source.

3. A guard according to claim 2 wherein the second end of the guard having a smooth surface has a distinctive color.

4. A guard according to claim 1 wherein the second end of the guard having a smooth surface has a hole therethrough.

5. A guard according to claim 4 further including a locking mechanism engaged with the hole.

* * * * *